United States Patent
Chu et al.

(10) Patent No.: US 6,615,299 B1
(45) Date of Patent: Sep. 2, 2003

(54) DYNAMICALLY TRANSLATING COMMANDS FROM AN INPUT DEVICE INTO COMMANDS UNDERSTANDABLE BY AN APPLICATION

(75) Inventors: Heston H.S. Chu, Portland, OR (US); Echo Y. P. Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/495,201

(22) Filed: Jan. 31, 2000

(51) Int. Cl.[7] .............................................. G06F 13/12

(52) U.S. Cl. ........................ 710/65; 710/63; 710/62; 710/33; 710/66; 710/68; 710/67; 463/36; 463/37; 463/38

(58) Field of Search ................................ 710/62–68, 5; 463/37, 38

(56) References Cited

U.S. PATENT DOCUMENTS

| | | | | |
|---|---|---|---|---|
| 4,896,290 A | * | 1/1990 | Rhodes et al. | 710/67 |
| 5,708,828 A | * | 1/1998 | Coleman | 715/523 |
| 5,982,399 A | * | 11/1999 | Scully et al. | 345/522 |
| 6,213,880 B1 | * | 4/2001 | Sim | 463/37 |
| 6,243,079 B1 | * | 6/2001 | Liu | 345/168 |

* cited by examiner

Primary Examiner—Jeffrey Gaffin
Assistant Examiner—Mike Nguyen
(74) Attorney, Agent, or Firm—Trop, Pruner & Hu, P.C.

(57) ABSTRACT

An input device may operate with a variety of different host processor-based systems running a variety of different applications by providing a translation module which translates input commands in one format to a format compatible with one or more applications that may run on a given processor-based system. A table may be provided, for example, in software, which enables a variety of different input device formats to be converted into a variety of formats utilized by an application. In this way, contention between an application and an input device may be resolved.

10 Claims, 2 Drawing Sheets

DYNAMICALLY TRANSLATING COMMANDS FROM AN INPUT DEVICE INTO COMMANDS UNDERSTANDABLE BY AN APPLICATION

BACKGROUND

This invention relates generally to processing of input commands by processor-based systems.

A well defined protocol exists for commands from input devices to processor-based systems. For example, the Universal Serial Bus (USB) Device Class Definition for Human Interface Devices (HID), Firmware Specification, Version 1.1, dated Apr. 7, 1999 (available at www.usb.org) sets forth detailed systems for interfacing input devices with processor-based systems. However, a number of circumstances may arise which render such systems inapplicable. For example, a so-called legacy input device may be provided which does not provide signals in the proper format recognized under a given specification. Alternatively, an application running on a processor-based system may be a legacy application which is not adapted to recognize the particular commands provided by a given input device.

Thus, in a number of circumstances, there may be a mismatch between the command set provided by the input device and the command set recognized by a given application. In such cases, a given input device may not be useful with a given processor-based system or a given application may not be useful with a given processor-based system or a given input device.

Thus, there is a continuing need for a way to enable more input devices to work with more applications run on processor-based systems.

SUMMARY

In accordance with one aspect, a method includes receiving on a processor-based system a command from an input device in a first format. The command is translated to a second format compatible with an application on the processor-based system.

Other aspects are set forth in the accompanying detailed description and claims.

DETAILED DESCRIPTION

Figure 1:
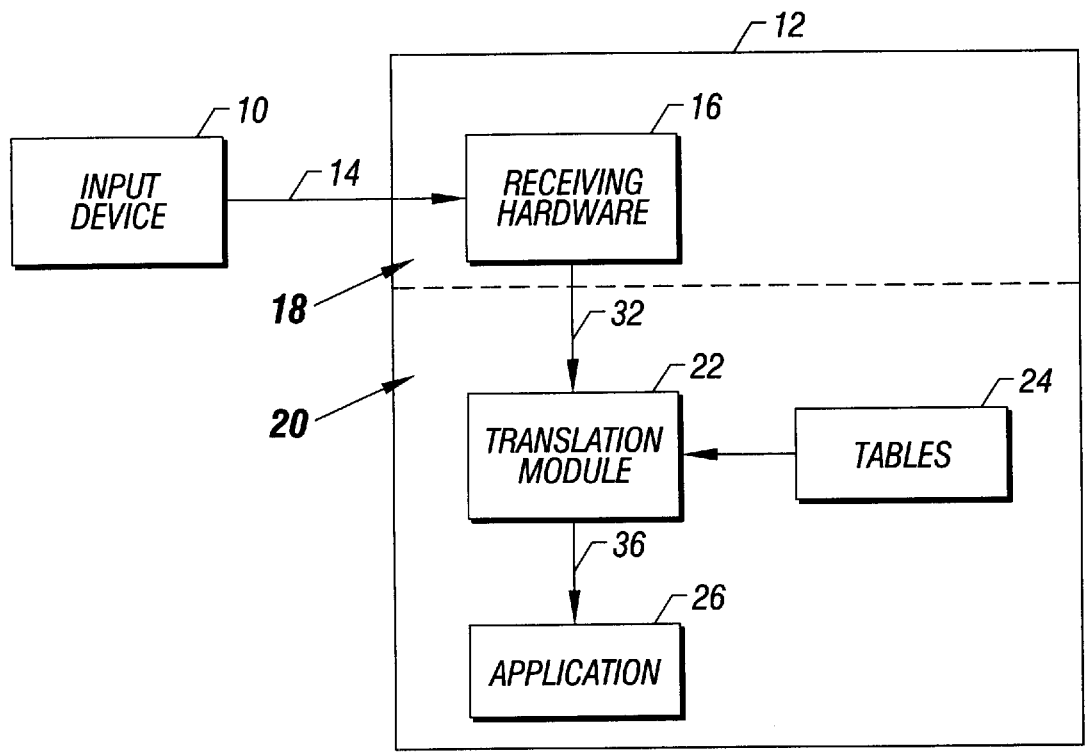
FIG. 1 is a schematic depiction of one embodiment of the present invention.

An input device 10, shown in FIG. 1, may interface with a host processor-based system 12 through a link 14. Examples of input devices 10 include keyboards, pointing devices, front panel controls, controls on processor-based devices such as telephones, video cassette recorders, games and simulation devices, sports equipment and appliances, as examples. The link 14 may be a cable such as a USB cable or a wireless link such as an infrared or radio frequency link as examples. The processor-based system 12 may be a desktop computer, a laptop computer, an appliance, a set top box, or any of a variety of other processor-based devices.

The input device 10 may provide a signal to the host processor-based system 12 in a first format. The host processor-based system 12 may include applications 26 which process input commands in a second format. For example, the input device 10 may operate in accordance with the HID Firmware Specification, but the application 26 may be a legacy or non-compliant application. Conversely, the application 26 may process commands in accordance with the HID Firmware Specification but the input device 10 may be a legacy device which provides numerical commands non-compliant with that specification.

While an example is provided of input devices 10 that are compliant or not compliant with the HID Firmware Specification, the present invention is applicable in a variety of situations where an input device provides commands in one format and an application processes commands in a different format. Similarly, while in one example, the link 14 is a Universal Serial Bus Specification compliant cable, the present invention is not in any way limited to USB embodiments.

The input device 10 may provide a signal over the link 14 that is received by interface or receiving hardware 16. The receiving hardware 16 passes a received command up an input stack, as indicated by the arrow 32. A translation module 22, which may be implemented in software or hardware, is responsible for translating the input command from the first format to the second format.

The translated command is then made available to the application 26 as indicated by the arrow 36. The translation module 22 may use a database or tables 24 to translate from one format to another. The available formats may be numerous and the conversions between these formats may be equally numerous. Therefore, tables 24 may provide information about how to convert from one a variety of formats to one of another variety of formats.

In one embodiment of the present invention, the input device 10 is a remote control unit and the host processor-based system 12 may be a set top processor-based system. In such case, the link 14 may be a bidirectional infrared link and the receiving hardware 16 may be an infrared interface device. In this case, a legacy input device 10 may provide numerical commands while HID Firmware Specification compliant codes may be used by the application 26.

The ability to dynamically change the RCU commands to keystroke combinations may be useful, for example, when modifying an application's behavior. For example, an application may be designed to run full screen as the sole application. However, there may be times when more than one application may be active on a given display. In order to have these applications coexist when they share the screen as well as to allow these applications to be controlled by the same RCU, functionality can be limited during the times that the applications share focus. In order to facilitate this limiting of functionality, inputs may be masked, allowing an application's behavior to be modified without having to change the state of the application. For example, the input commands may be masked in the translation module 22 at various times.

In addition, the RCU functionality may be remapped on different applications without modifying a previously functional application. For example, a web browser may have accelerator keys for its navigation functions. The client application may support the web browser when the web browser takes focus, by modifying the RCU commands to keystroke combinations that reflect the accelerator keys on the web browser's user interface. Thus, differences between input device and application can be handled externally to the application and the input device.

Figure 2:
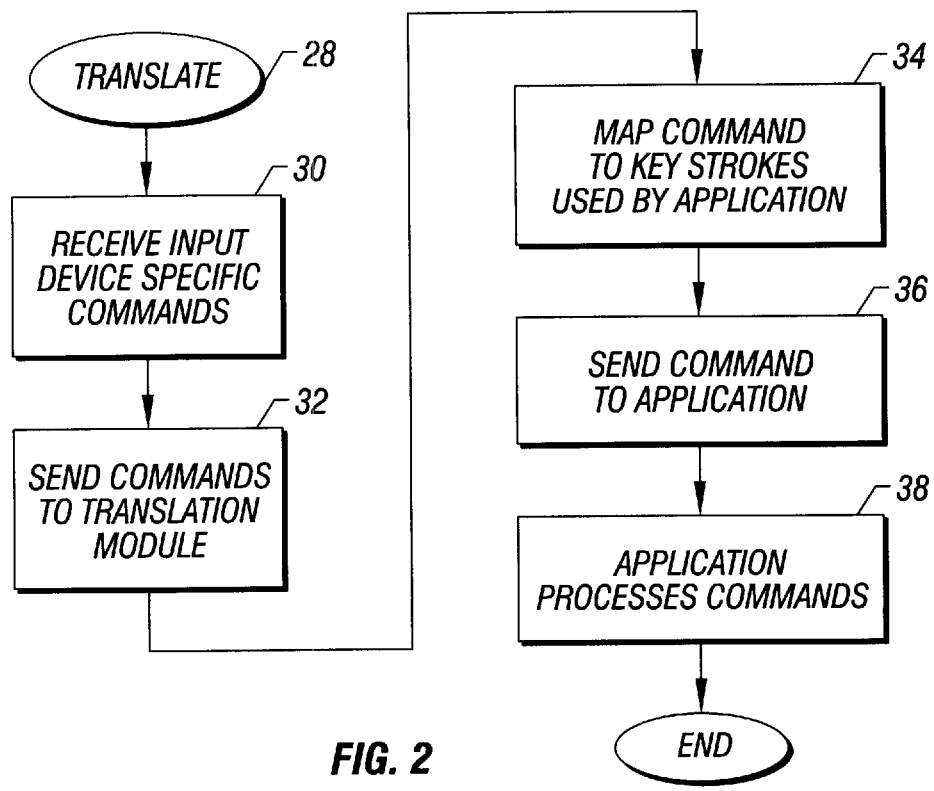
FIG. 2 is a flow diagram for software for implementing one embodiment of the present invention.

Turing now to FIG. 2, in an embodiment in which the translation module 22 is implemented in software 28, input device specific commands may be received as indicated in block 30. In one embodiment of the present invention, legacy and numerical commands from an input device 10 may be received by the host processor-based system 12. These commands are then provided, as indicated in block 32, to the translation module 22. The translation module 22 maps the commands received from the input device 10 to keystrokes in accordance with the protocol utilized by a particular application, as indicated in block 34.

The translated commands may then be provided to the application 26 as indicated in block 36. The application 26 then processes the commands, as indicated in block 38, without modification of the application.

Figure 3:
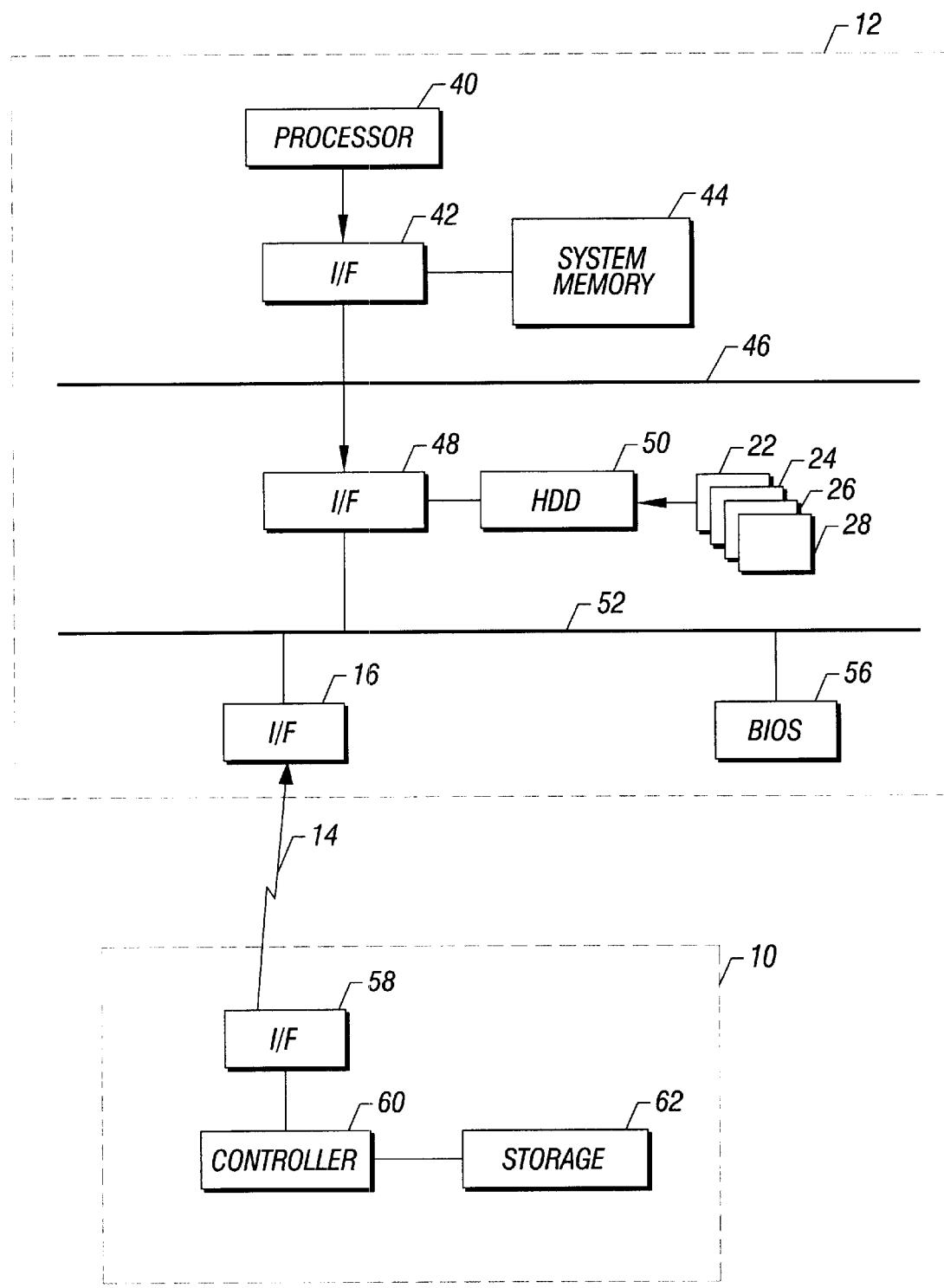
FIG. 3 is a hardware block diagram of one embodiment of the present invention.

Referring next to FIG. 3, a host processor-based system 12 may include a wireless link 14 with a remote control unit acting as the input device 10. The system 12 may include a processor 40 coupled to an interface 42 such as a bridge or a chipset. The interface 42 may, for example, couple a system memory 44 and a bus 46. The bus 46 in turn may be coupled to another interface 48 which also may be a bridge or part of a chipset. The interface 48 may in turn be coupled to a hard disk drive 50 or other storage medium, such as floppy drive, a compact disk drive, a digital versatile disk drive, a flash memory or the like. The module 22, if implemented in software, the tables 24, the software 28 and the application 26 may be stored on the hard disk drive 50 in one embodiment of the present invention.

A second bus 52 may be coupled to an airwave interface operating as the receiving hardware 16. The hardware 16 may receive signals from the input device 10 and may convert those signals into a form compatible with the processor-based system 12.

The input device 10 may be conventional in many respects and may include a wireless interface 58 which is coupled to a key code generating controller 60. The controller 60 in turn may be coupled to a storage 62 that may store operating protocols for the input device 10. In one embodiment of the present invention, the input device 10 may be battery powered.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

determining which of two applications has focus, each of those applications accepting commands in a format different than the format accepted by the other of the two applications; and translating a command received in a format incompatible with the application having focus into a format compatible with the application having focus.

2. The method of claim 1 including converting a numerical command in a first format to a second format in terms of keystroke combinations.

3. The method of claim 1 including translating the command externally to the application having focus and externally to the other application.

4. The method of claim 1 including receiving the command from a remote control unit.

5. The method of claim 4 including converting the command received from the remote control unit to a format suitable for navigating in a web browser.

6. An article comprising a medium storing instructions that, if executed, enable a processor-based system to perform the steps of:

determining which of two applications has focus, each of those applications accepting commands in a format different than the format accepted by the other of the two applications; and translating a command received in a format incompatible with the application have focus into a format compatible with the application having focus.

7. The article of claim 6 further storing instructions that, if executed, enable a processor-based system to perform the step of converting a numerical command in a first format to a second format in terms of keystroke combinations.

8. The article of claim 6 further storing instructions that, if executed, enable a processor-based system to perform the step of translating the command externally to the application having focus and externally to the other application.

9. The article of claim 6 further storing instructions that, if executed, enable the processor-based system to perform the step of receiving the command from a remote control unit.

10. The article of claim 9 further storing instructions that, if executed, enable the processor-based system to perform the step of converting the command received from the remote control unit to a format suitable for navigating in a web browser.

* * * * *